United States Patent [19]

Kamiya et al.

[11] Patent Number: 5,100,698
[45] Date of Patent: Mar. 31, 1992

[54] METHOD AND APPARATUS FOR APPLYING RELEASING AGENT TO GLASS PLATE

[75] Inventors: Masaaki Kamiya, Tsu; Masami Nishitani, Mie, both of Japan

[73] Assignee: Central Glass Company, Limited, Ube, Japan

[21] Appl. No.: 630,002

[22] Filed: Dec. 19, 1990

[30] Foreign Application Priority Data

Dec. 20, 1989 [JP] Japan .................................. 1-330076
Jan. 19, 1990 [JP] Japan .................................. 2-10002

[51] Int. Cl.$^5$ ............................................. B05D 5/06
[52] U.S. Cl. .................................. 427/168; 427/348; 427/421; 427/424; 427/427
[58] Field of Search ............... 427/168, 348, 424, 427, 427/421

[56] References Cited

U.S. PATENT DOCUMENTS

| | | | |
|---|---|---|---|
| 3,056,696 | 10/1962 | Browne | 427/168 |
| 3,900,639 | 8/1975 | Lauterbach | 427/348 |
| 4,824,695 | 4/1989 | Coulon et al. | 427/168 |
| 4,933,211 | 6/1990 | Sauvinet et al. | 427/168 |

Primary Examiner—Janyce Bell
Attorney, Agent, or Firm—Fleit, Jacobson, Cohn, Price, Holman & Stern

[57] ABSTRACT

The invention relates to the application of a releasing agent to a surface of a glass plate which is to be subsequently bent in a heated state together with another glass plate thereon. The glass plate is held in a standing posture, and hot air is blown perpendicularly against a surface of the glass plate, and simultaneously an aqueous solution of a releasing agent is sprayed from a plurality of spray nozzles into a space in front of the glass plate surface such that the sprayed solution mixes with the hot air before arriving at the glass plate surface. In an embodiment the spray nozzles are directed parallel to the glass plate or obliquely so as to make a small acute angle with the glass plate and arranged such that the hot air forces droplets of the sprayed solution to move toward the glass plate surface together with the hot air. In another embodiment the spray nozzles are directed perpendicularly toward the glass plate and arranged such that the sprayed solution soon mixes with the hot air. In either case coating of the glass plate surface with the releasing agent and drying of the coating are efficiently accomplished with little possibility of a fall of foreign matter onto the glass plate surface under treatment.

9 Claims, 3 Drawing Sheets

FIG.5
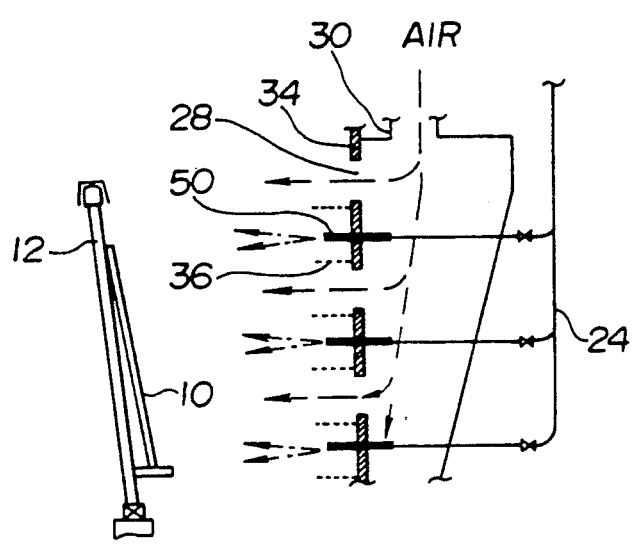
FIG.6
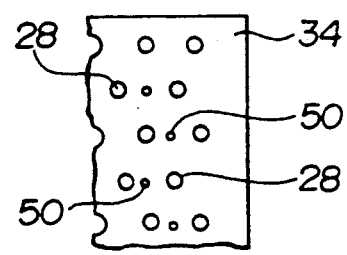
FIG.7
FIG.8
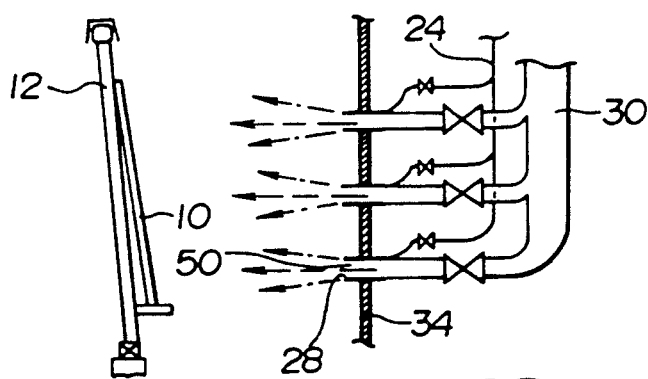
FIG.10
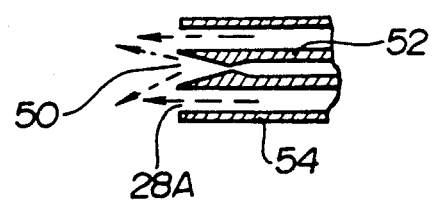
FIG.9
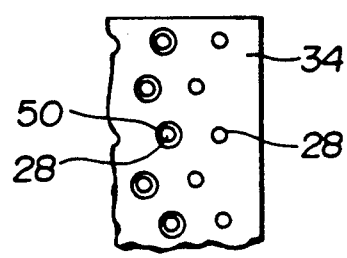

METHOD AND APPARATUS FOR APPLYING RELEASING AGENT TO GLASS PLATE

BACKGROUND OF THE INVENTION

This invention relates to a method for applying a releasing agent to a glass plate before subjecting the glass plate to hot bending working and an apparatus for same.

In producing a laminated and curved glass panel such as an automobile windshield it is often to simultaneously bend two glass plates before the lamination operation. That is, the two glass plates are placed one on top of the other without inserting any plastic interlayer therebetween, and in a suitably heated state the two glass plates are simultaneously and similarly bent, for example, by a press bending method. The thus bent two glass plates need to be separated from each other in advance of the lamination operation, but there is a possibility that the two glass plates adhere to each other by superficial fusion during the hot bending working. To prevent the two glass plates from adhering to each other it is known to apply a releasing agent to one of the two glass plate in advance. For example, gypsum, talc, calcium carbonate or mica is used as the releasing agent, and the releasing agent is applied to the glass plate as a dry powder or as a suspension or solution in a liquid, as described in JP No. 54-21847.

In the case of applying a releasing agent in the form of a dry powder to a glass plate it is not seldom that the powder is unevenly scattered over the glass plate surface so that the glass plate locally adheres to another glass plate when the two glass plates are provisionally laminated and simultaneously heated and bent. Besides, it is not easy to completely remove the releasing agent powder from each of the bent glass plates, and it is not rarely that the residual releasing agent turns into foreign matter which renders the glass plate defective. In the case of using a suspension of a releasing agent powder in a liquid the suspension on the glass plate surface must be dried to turn into a coating of a dry powder. Also in this case it is not easy to completely remove the powder from the glass plate after bending the glass plate.

It is possible to use a water soluble compound as the releasing agent, and it is relatively easy to form a uniform and relatively thin coating by applying an aqueous solution of the soluble releasing agent onto a glass plate and drying the liquid film on the glass plate surface. In this case the releasing agent can easily be removed from the glass plate by washing with water after bending the glass plate.

In conventional processes of producing laminated and curved glass panels with the use of a releasing agent, each glass plate is held horizontally while the releasing agent is applied thereto because this is convenient for the subsequent operations such as placing another glass plate on the glass plate coated with the releasing agent and then placing the two glass plates on a bending mold. However, during the application of the releasing agent it is not rarely that coarse particles of the releasing agent or particles of foreign materials fall onto the horizontally held glass plate from the top of the spraying booth or the environmental atmosphere and adhere to the glass plate. At the subsequent stage of bending provisionally laminated two glass plates the existence of a particle of foreign matter on the contacting surface of one glass plate is liable to result in the formation of a tiny concavity in either of the two bent glass plates. In the obtained glass panel such a concavity will cause local distortion of transmitted or reflected images as is called "spot distortion", and the glass panel will be judged to be defective.

SUMMARY OF THE INVENTION

It is an object of the present invention to provide an improved method for applying a releasing agent to a glass plate which is to be subsequently bent in a heated state, by which method a uniform and easily removable coating of the releasing agent can be formed on a surface of the glass plate easily and efficiently while the possibility of deposition of foreign matter on the glass plate surface is almost eliminated.

It is another object of the invention to provide an apparatus for performing the method according to the invention.

According to the invention an aqueous solution of a releasing agent is applied to a surface of a glass plate, which is held in a standing posture, by blowing hot air against the glass plate surface and simultaneously spraying the solution from a plurality of nozzles such that the sprayed solution mixes with the hot air before arriving at the glass plate surface.

As a preferred embodiment of the invention, there is provided a method of applying a releasing agent to a surface of a glass plate which is to be subsequently bent in a heated state, the method comprising (a) holding the glass plate in a vertically or nearly vertically standing posture, (b) spraying an aqueous solution of a releasing agent into a space in front of the glass plate surface from a plurality of spray nozzles which are directed substantially parallel to the glass plate surface or obliquely so as to make an acute angle not greater than 30 degrees with the glass plate surface, and (c) simultaneously with step (b) blowing hot air substantially perpendicularly onto the glass plate surface through the aforementioned space such that the hot air mixes with the sprayed solution and forces droplets of the solution to move toward the glass plate surface together with the hot air.

As another preferred embodiment of the invention there is provided a method for the same purpose, the method comprising (a) holding the glass plate in a vertically or nearly vertically standing posture, (b) spraying an aqueous solution of a releasing agent into a space in front of the glass plate surface from a plurality of spray nozzles which are directed substantially perpendicularly toward the glass plate surface, and (c) simultaneously with step (b) blowing hot air substantially perpendicularly onto the glass plate surface through the aforementioned space such that the hot air mixes with the sprayed solution while the sprayed solution and the hot air are moving toward the glass plate surface.

In this invention the glass plate is kept in a standing posture while an aqueous solution of a releasing agent is applied thereto. Accordingly the possibility of the fall of particles of foreign matter onto the glass plate under treatment is greatly reduced. Therefore, it is possible to considerably reduce the probability of the occurrence of optical distortions in curved glass panels produced by using glass plates to which the releasing agent is applied.

Furthermore, by a method according to the invention the hot air blown toward the glass plate makes good contact with the droplets of the sprayed solution of the releasing agent and hence further reduces the size of the liquid droplets while transferring heat to the liquid droplets. Therefore, there occurs efficient evaporation of water from the tiny droplets of the sprayed solution. As a result the glass plate surface is coated with semi-dry particles of the releasing agent, and the coating rapidly solidifies. Thus, the whole process of coating a surface of the glass plate with the releasing agent is accomplished very efficiently. This process can be performed while a carriage holding thereon the glass plate in the standing position is moving along a predetermined path by the operation of a conveying or tracting means. Since an aqueous solution of a releasing agent is used it is easy to remove the releasing agent from the glass plate surface after bending the glass plate.

For example, the releasing agent can be selected from potassium sulfate, sodium sulfate, potassium carbonate and sodium carbonate.

BRIEF DESCRIPTION OF THE DRAWINGS

FIG. 5 is an explanatory illustration, in a side elevational view, of the manner of supplying liquid droplets from spray nozzles in the apparatus of FIG. 4 to a surface of a glass plate together with hot air;

FIG. 6 is a fragmentary, front elevational view of a hot air blasthead used in the apparatus of FIG. 4 and shows the arrangement of the spray nozzles through the blasthead;

FIG. 7 shows a modification of the arrangement of the spray nozzles through the blasthead of FIG. 6;

FIG. 8 is an explanatory illustration, in a side elevational view, of another modification of the arrangement of the spray nozzles in the hot air blasthead in the apparatus of FIG. 4;

FIG. 9 is a fragmentary, front elevational view of the blasthead in FIG. 8; and

FIG. 10 is a longitudinal sectional view of a duplex nozzle which can be used in an apparatus according to the invention.

DESCRIPTION OF THE PREFERRED EMBODIMENTS

Figure 1:
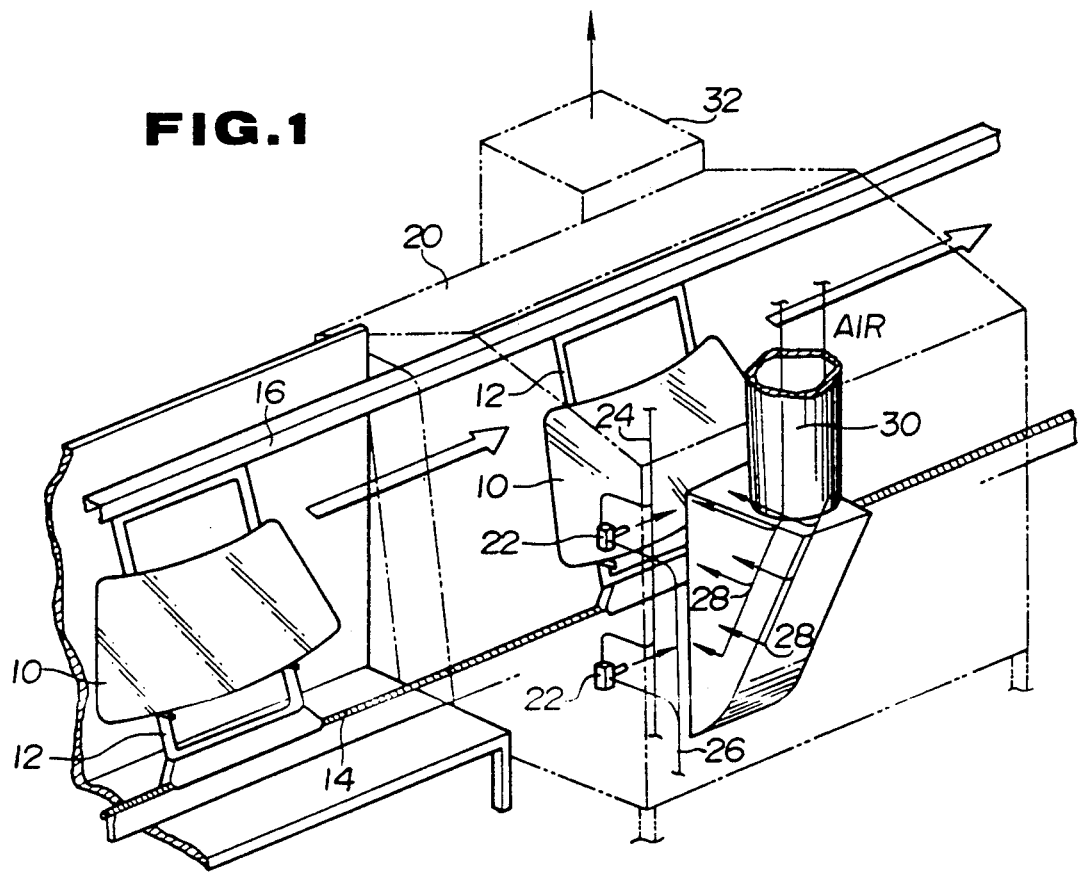
FIG. 1 is a partly cutaway, perspective view of a spray coating apparatus embodying the present invention.

FIG. 1 shows a spraying booth 20 in which a solution of a releasing agent is consecutively applied to a plurality of glass plates 10. The glass plates 10 are cut into a desired shape in advance, and each glass plate 10 is placed on a stand 12 in a nearly vertically standing posture. A conveyor chain 14 extends through a lower section of the spraying booth 20, and a guide rail 16 extends through an upper section of the booth 20. Each stand 12 engages with the conveyor chain 14 at the bottom and makes sliding contact with the guide rail 16 at the top.

A plurality of spray nozzles 22 are provided in a spraying zone of the booth 20 to spout a solution of a releasing agent into the spraying zone. The spray nozzles 22 are located at several levels corresponding to the height of the glass plate 10 in the standing posture. The nozzles 22 connect with a tank (not shown) through piping 24. For example, the releasing agent solution is a solution of sodium sulfate in hot water having a temperature of about 30° C. or higher and is about 20 wt % or higher in the concentration of the sulfate. For the spraying operation compressed air is supplied to the nozzles 22 through piping 26. Besides, the booth 20 is provided with a plurality of ports 28 to blow hot air into the spraying zone. It is suitable to use hot air having a temperature of about 60° C. or above, and, for example, such hot air is economically obtained by heat exchange between cold air and an effluent gas from a furnace for heat treatment of the glass plates. The hot air is supplied to the ports 28 through a duct 30 by using a blower (not shown). Numeral 32 indicates a dust collector for adsorption of a mist of a waste portion of the sprayed releasing agent solution before introducing the waste hot air into an exhaust duct (not shown) for dissipation or recirculation.

In the spraying booth 20 of FIG. 1 the spray nozzles 22 are directed such that the direction of spouting the releasing agent solution is substantially horizontal and substantially parallel to the glass plate 10 which assumes the standing position in the spraying zone. However, it is optional to slightly deflect the spray nozzles 22, or some of them, toward the glass plate 10 such that the direction of spouting of the solution makes a shallow angle, viz. an acute angle not greater than about 30 degrees, with the glass plate. On the other hand, the ports 28 are arranged so as to blow hot air against the glass plate 10 substantially perpendicularly. The ports 28 are located such that the releasing agent solution is sprayed into a gap between the glass plate 10 and the ports 28.

Figure 2:
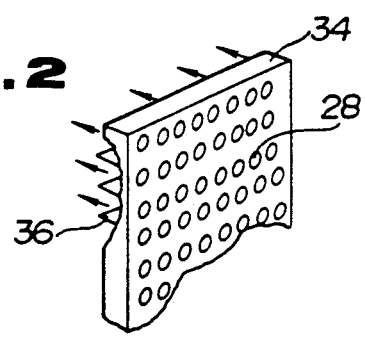
FIG. 2 is a fragmentary, perspective view of a hot air blasthead used in the apparatus of FIG. 1.

Referring to FIG. 2, for example the hot air blowing ports 28 are through-holes in a blasthead 34 which is a block of a punched metal. Optionally, flow straightening vanes 36 may be attached to the blasthead 34 on the side facing the glass plate 10. The ports or holes 28 are arranged so as to blow hot air uniformly onto the entire surface area of the glass plate 10.

Figure 3:
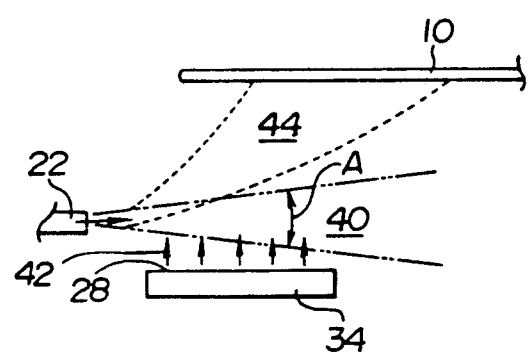
FIG. 3 is an explanatory illustration, in a plan view, of the manner of supplying liquid droplets from spray nozzles in the apparatus of FIG. 1 to a surface of a glass plate together with hot air.

Referring to FIG. 3, the spray nozzles 22 spout the releasing agent solution such that a vertical column 40 (shown by two-dot chain lines) of liquid droplets is produced in the space between the glass plate 10 and the hot air blasthead 34. In horizontal sections the column 40 has a relatively thin wedge-like shape. That is, the angle of lateral dispersion, A in FIG. 3, of the sprayed solution is relatively small. As the jets of hot air 42 from the ports 28 collide against the liquid column 40, the liquid droplets constituting the column 40 are deflected toward the glass plate 10, dispersed as indicated by broken lines and numeral 44 and blown against the front surface of the glass plate 10. During this process the liquid droplets are further atomized to become very tiny droplets ranging from about 2 μm to about 20 μm in diameter. By the action of the hot air on such tiny liquid droplets there occurs efficient evaporation of water from the droplets even before the arrival of the droplets at the glass plate surface. Therefore, the glass plate 10 is coated with nearly dry particles, and the coating becomes a fully solidified coating formed of a powder of the releasing agent before the arrival of the glass plate 10 at the exit of the spraying booth 20. That is, drying of the coating is accomplished during the solution spraying operation.

By virtue of keeping the glass plates 10 in a standing posture while they are passing through the spraying booth 20, the application of the releasing agent is accomplished with little possibility of falling of foreign matter onto the glass plate under treatment. Therefore, at the subsequent operation for bending two glass plates placed one on top of the other the probability of the occurrence of optical defects such as spot distortions of transmitted or reflected images lessens considerably.

From a practical point of view the apparatus of FIG. 1 has another advantage that the spraying booth can be made relatively compact because the spray nozzles 22 can be located at a relatively short horizontal distance from the glass plate 10.

Figure 4:
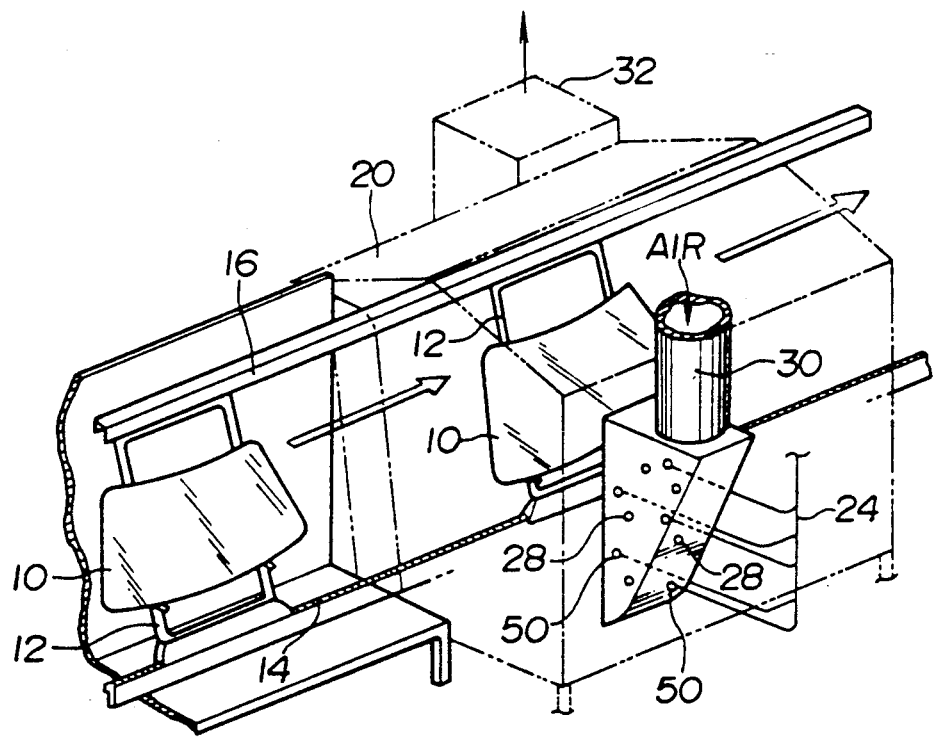
FIG. 4 is a partly cutaway, perspective view of a spray coating apparatus as another embodiment of the invention.

FIGS. 4-6 show another embodiment of the invention. The apparatus of this embodiment is generally similar to the apparatus of FIG. 1, but there is a difference in the arrangement of the spray nozzles. Also in this case the glass plates 12 are individually placed on stands 12 to keep a nearly vertically standing posture while passing through the spraying booth 20. The spraying zone of the booth 20 is provided with a plurality of spray nozzles 50 which are located in the vicinity of the ports 28 for blowing hot air into the spraying zone. The spray nozzles 50 are directed so as to spout the releasing agent solution substantially horizontally and substantially perpendicularly toward the glass plate 10. That is, in this apparatus the releasing agent solution and hot air are spouted in substantially the same direction.

For example, as shown in FIGS. 5 and 6 the ports 28 for blowing hot air are through-holes in a blasthead 34 using a punched metal block, and the spray nozzles 50 extend through the blasthead 34 at selected locations between the holes 28. The holes 28 and the spray nozzles 50 are arranged so as to uniformly apply hot air and the releasing agent solution to the entire surface area of the glass plate 10. In FIG. 5 numeral 36 indicates flow straightening vanes optionally attached to the blasthead 34 for desirably directing the hot air.

In the spraying zone the jets of hot air from the holes 28 make good contact with the sprayed solution of the releasing agent and efficiently transfer heat to the droplets of the solution. By the action of hot air the liquid droplets are further atomized into very tiny droplets, and concurrently there occurs efficient evaporation of water from the liquid droplets moving toward the glass plate 10. Therefore, a coating of nearly dry particles of the releasing agent is formed on the glass plate surface, and the coating fully dries and solidifies before the glass plate 10 arrives at the exit of the spraying booth 20. Thus, also in this case the application of the releasing agent solution to the glass plate 10 and the drying of the resultant coating are accomplished easily, efficiently and almost simultaneously.

FIG. 7 shows another arrangement of the spray nozzles 50 in the apparatus of FIG. 4. In this case each of the spray nozzles 50 is inserted in a selected through-hole 28 in the blasthead 34, so that the releasing agent solution spouted from each nozzle 50 immediately contacts with hot air. FIGS. 8 and 9 show a modification of the arrangement of FIG. 7. In this case each of the spray nozzles 50 is annular in cross section and concentrically surrounds a selected through-hole 28 in the blasthead 34. Irrespective of the positional relation between the spray nozzles and the hot air blowing holes or ports 28, it is optional to devise so as to spout hot air in a swirling state from each hole or port 28.

Still alternatively, as shown in FIG. 10 each of the spray nozzles 50 in the apparatus of FIG. 4 may use a Venturi tube 52 having a constricted throat section and a diverging tip section. In this case it is suitable to construct a duplex nozzle by inserting the Venturi tube 52 concentrically in an outer tube 54 so as to provide an annular nozzle 28A for spouting hot air.

What is claimed is:

1. A method of applying a releasing agent to a surface of a glass plate which is to be subsequently bent in a heated state, the method comprising the steps of:
   (a) holding the glass plate in a vertically or nearly vertically standing posture;
   (b) spraying an aqueous solution of a releasing agent into a space in front of said surface of the glass plate from a plurality of spray nozzles which are directed substantially parallel to said surface of the glass plate or obliquely so as to make an acute angle not greater than 30 degrees with said surface of the glass plate; and
   (c) simultaneously with step (b) blowing hot air substantially perpendicularly onto said surface of the glass plate through said space such that the hot air mixes with the solution sprayed into said space and forces droplets of the solution to move toward said surface of the glass plate together with the hot air.

2. A method according to claim 1, wherein said spray nozzles are directed substantially horizontally.

3. A method according to claim 1, wherein said aqueous solution has a temperature not lower than 30° C. when sprayed from said nozzles, said hot air having a temperature not lower than 60° C.

4. A method according to claim 1, wherein said hot air is spouted from a plurality of ports.

5. A method of applying a releasing agent to a surface of a glass plate which is to be subsequently bent in a heated state, the method comprising the steps of:
   (a) holding the glass plate in a vertically or nearly vertically standing posture;
   (b) spraying an aqueous solution of a releasing agent into a space in front of said surface of the glass plate from a plurality of spray nozzles directed substantially perpendicularly toward said surface of the glass plate; and
   (c) simultaneously with step (b) blowing hot air substantially perpendicularly onto said surface of the glass plate through said space such that the hot air mixes with the solution sprayed into said space while the sprayed solution and the hot air are moving toward said surface of the glass plate.

6. A method according to claim 5, wherein said spray nozzles are directed substantially horizontally.

7. A method according to claim 5, wherein said hot air is spouted from a plurality of ports, said spray nozzles being located between said plurality of ports.

8. A method according to claim 5, wherein said hot air is spouted from a plurality of ports, each of said spray nozzles is arranged concentrically with one of said plurality of ports.

9. A method according to claim 5, wherein said aqueous solution has a temperature not lower than 30° C. when sprayed from said nozzles, said hot air having a temperature not lower than 60° C.

* * * * *